(No Model.)
J. H. McDONALD
MACHINE FOR MIXING AND WORKING OLEOMARGARINE.
No. 270,454. Patented Jan. 9, 1883.
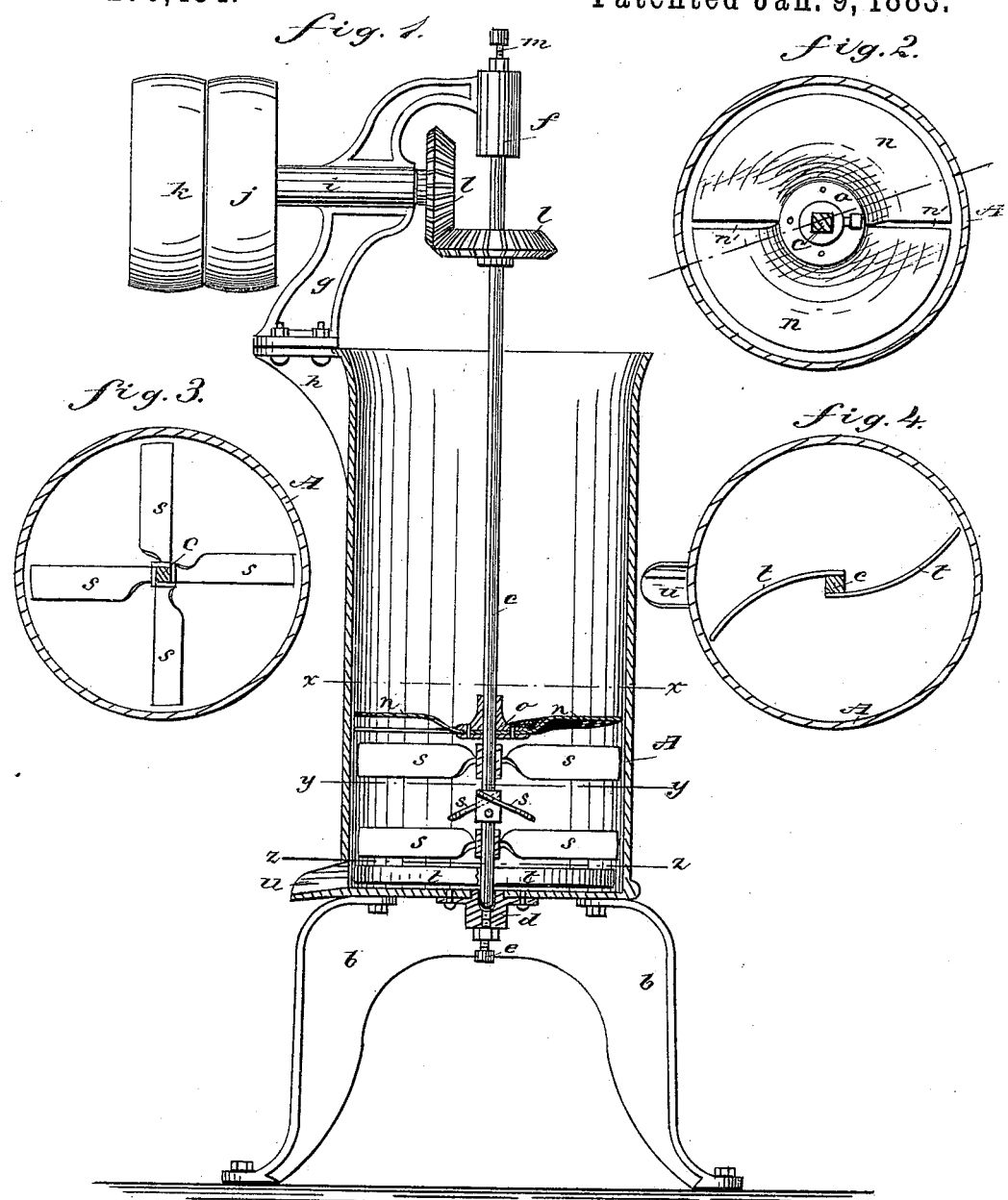
WITNESSES:
INVENTOR:
J. H. McDonald
BY Munn & Co.
ATTORNEYS.

UNITED STATES PATENT OFFICE.

JOSEPH H. McDONALD, OF NEW YORK, N. Y.

MACHINE FOR MIXING AND WORKING OLEOMARGARINE.

SPECIFICATION forming part of Letters Patent No. 270,454, dated January 9, 1883.

Application filed June 21, 1882. (No model.)

*To all whom it may concern:*

Be it known that I, JOSEPH H. MCDONALD, of the city, county, and State of New York, have invented a new and Improved Machine for Mixing and Working Oleomargarine, of which the following is a full, clear, and exact description.

My invention relates to a hollow vertical cylinder, in which is a central vertical shaft arranged in a foot-step in the bottom of the cylinder, and a bracket attached to and overhanging the top of the cylinder, the said shaft being armed with helical feeding and working blades and dischargers in the lower portion of the cylinder for working the matters to be treated and discharging them through a spout, the shaft being rotated by means of power applied to the upper end, whereby oleomargarine and other substances requiring like treatment may be efficiently and rapidly worked by power to drive out water, milk, and other like matters for preventing the said substances from becoming rancid, all as hereinafter fully described.

Reference is to be had to the accompanying drawings, forming part of this specification, in which similar letters of reference indicate corresponding parts in all the figures.

Figure 1 is a sectional elevation of my improved machine. Fig. 2 is a horizontal section taken on line $x\,x$ of Fig. 1. Fig. 3 is a horizontal section taken on line $y\,y$ of Fig. 1, and Fig. 4 is a horizontal section taken on line $z\,z$ of Fig. 1.

A represents the hollow cylindrical case or tub to hold the oleomargarine, or it may be butter or other like substances requiring to be worked in like manner. Said case is mounted on a suitable bench, $b$, and has a vertical shaft, $c$, located centrally in it and fitted in a step, $d$, at the bottom of the case, said step having an adjusting-screw, $e$, for its bottom, whereby the height of the shaft may be accurately adjusted. This shaft extends above the top of the case, and is arranged in a thrust-bearing, $f$, of a strong bracket, $g$, bolted onto a bracket, $h$, of the case. Bracket $g$ carries a driving-shaft in bearing $i$, having fast and loose pulleys $j$ and $k$ for the application of the driving-belt, and gearing with shaft $c$ by the bevel-wheels $l$. The bearing $f$ has an adjusting-screw, $m$, to take the thrust of the shaft.

In the lower part of the case A the shaft is provided with helical workers consisting of disk $n$, fastened to it by a collar, $o$, and set-screw $p$, said disk being radially slit, as at $n'$, and the metal of each half thereof bent in half-helices of moderate pitch, as shown in Figs. 1 and 2, for gathering the matters to be worked under it and for forcing them down to the other workers below, consisting of a series of twisted propeller-shaped blades, $s$, suitably attached to the shaft for being revolved within the substance under treatment to work and press it powerfully to expel the liquid matters and refine the grain.

Below the twisted workers $s$ a couple of discharging-arms, $t$, are attached to the shaft for expelling the matters under treatment from under the working-blades through the delivery-spout $u$, all being calculated to apply power to the working of such substances more rapidly and efficiently than can be done by hand, and with a large economy of labor, as will be readily understood. The water, milk, and other free liquids being thus worked out are discharged with the oleomargarine from the cylinder. The oleomargarine may then be readily separated from the free liquids and employed for the desired purpose.

It will also be readily understood that the lowermost workers in the case may be arranged upon a separate sleeve or shaft suitably connected with the driving-power to cause the workers to operate reversely to each other for more speedy and thorough mixing of the mass within the case.

Having thus fully described my invention, I claim as new and desire to secure by Letters Patent—

In a machine for working oleomargarine, the combination, with an open-topped vertical cylinder having outlet at the lower edge, of the upper disk, $n$, radially slit at $n'$ and bent into half-helices, the subjacent twisted propeller-shaped blades $s$, and the curved discharge-arms $t$ at the lowest end; said disk, blades, and arms being arranged rigidly on the same central rotary shaft, whereby the oleomargarine may be continuously fed at the top, worked, and discharged, as set forth.

JOSEPH HENRY McDONALD.

Witnesses:
ROBERT FYFE,
ROBERT B. McGOWN.